(12) United States Patent
Shao (10) Patent No.: US 11,283,740 B2
(45) Date of Patent: Mar. 22, 2022

(54) NAME LABEL DISPLAY METHOD AND APPARATUS

(71) Applicant: TIANJIN BYTEDANCE TECHNOLOGY CO., LTD., Tianjin (CN)

(72) Inventor: Xiaolin Shao, Beijing (CN)

(73) Assignee: TIANJIN BYTEDANCE TECHNOLOGY CO., LTD., Tianjin (CN)

(*) Notice: Subject to any disclaimer, the term of this patent is extended or adjusted under 35 U.S.C. 154(b) by 0 days.

(21) Appl. No.: 17/245,059

(22) Filed: Apr. 30, 2021

(65) Prior Publication Data

US 2021/0266276 A1 Aug. 26, 2021

Related U.S. Application Data

(63) Continuation of application No. PCT/CN2020/073272, filed on Jan. 20, 2020.

(30) Foreign Application Priority Data

Feb. 19, 2019 (CN) .......................... 201910121357.8

(51) Int. Cl.
*H04L 12/58* (2006.01)
*H04L 51/063* (2022.01)
(Continued)

(52) U.S. Cl.
CPC .......... *H04L 51/063* (2013.01); *H04L 51/046* (2013.01); *H04L 51/16* (2013.01); *H04L 51/18* (2013.01)

(58) Field of Classification Search
CPC ..... H04L 51/063; H04L 51/046; H04L 51/16; H04L 51/18; H04L 51/04; H04L 51/02;
(Continued)

(56) References Cited

U.S. PATENT DOCUMENTS 7,203,910 B1\* 4/2007 Hugh .................... G06F 16/904
715/804
2006/0059247 A1\* 3/2006 Marappan ............. G06F 40/174
709/219
(Continued)

FOREIGN PATENT DOCUMENTS

CA 2453716 A1 6/2005
CN 1730279 A 2/2006
(Continued)

OTHER PUBLICATIONS

International Search Report for International Patent Application No. PCT/CN2020/073272, dated Apr. 22, 2020, 5 pages with English Translation.
(Continued)

*Primary Examiner* — Ninos Donabed (57) ABSTRACT

The present disclosure discloses a method and apparatus for displaying a name label. The method includes: obtaining an original group message sent in a group carrying an original name label of a specified user; obtaining a target name label corresponding to the original name label based on a language version of a client of a current recipient in the group; replacing the original name label of the specified user carried in the original group message with the target name label to generate a target group message carrying the target name label; and displaying the target group message to a recipient user on the client of the current recipient.

7 Claims, 7 Drawing Sheets

(51) Int. Cl.
*H04L 51/046* (2022.01)
*H04L 51/00* (2022.01)
*H04L 51/18* (2022.01)

(58) Field of Classification Search
CPC ........ G06F 40/58; G06F 40/40; G06F 40/242; G06F 3/0482; G06Q 30/0217; G06Q 10/107; G06Q 50/01; G10L 15/26
See application file for complete search history.

(56) References Cited

U.S. PATENT DOCUMENTS

| | | | | |
|---|---|---|---|---|
| 2008/0040096 | A1* | 2/2008 | Osada | G06F 40/45 704/3 |
| 2011/0137636 | A1* | 6/2011 | Srihari | G06F 40/53 704/2 |
| 2011/0282645 | A1* | 11/2011 | Khuda | H04L 51/063 704/3 |
| 2012/0197629 | A1* | 8/2012 | Nakamura | G10L 15/26 704/3 |
| 2012/0221321 | A1* | 8/2012 | Nakamura | G10L 15/32 704/2 |
| 2013/0166764 | A1* | 6/2013 | Boldt | H04L 67/02 709/230 |
| 2013/0226555 | A1* | 8/2013 | Lerum | G06F 9/454 704/2 |
| 2013/0227522 | A1* | 8/2013 | Lerum | G06F 9/44 717/120 |
| 2014/0164478 | A1 | 6/2014 | Kleppmann et al. | |
| 2014/0244236 | A1* | 8/2014 | Johnson, III | G06F 40/263 704/2 |
| 2015/0062605 | A1* | 3/2015 | McKinney | H04N 1/00498 358/1.13 |
| 2015/0347399 | A1* | 12/2015 | Aue | H04M 11/10 704/2 |
| 2015/0350451 | A1* | 12/2015 | Aue | H04M 3/42 379/202.01 |
| 2016/0175706 | A1* | 6/2016 | Urbano | A63F 13/69 463/31 |
| 2016/0259781 | A1* | 9/2016 | Nuggehalli | G06F 40/58 |
| 2016/0321247 | A1* | 11/2016 | Moussa | G06F 40/58 |
| 2016/0357734 | A1* | 12/2016 | Harada | G06F 3/04842 |
| 2017/0197152 | A1* | 7/2017 | Bojja | G06F 40/216 |
| 2018/0276202 | A1* | 9/2018 | Baek | H04L 51/046 |

FOREIGN PATENT DOCUMENTS

| | | |
|---|---|---|
| CN | 1866934 A | 11/2006 |
| CN | 101030198 A | 9/2007 |
| CN | 102222064 A | 10/2011 |
| CN | 104881279 A | 9/2015 |
| CN | 106453887 A | 2/2017 |
| CN | 106682967 A | 5/2017 |
| CN | 106776584 A | 5/2017 |
| CN | 106777261 A | 5/2017 |
| CN | 107391500 A | 11/2017 |
| CN | 109861904 A | 6/2019 |
| KR | 20130130611 A | 12/2013 |

OTHER PUBLICATIONS

Chinese Patent Application No. 201910121357.8, First Office Action and Search Report dated Mar. 17, 2020, 15 pages with English Translation.

Chinese Patent Application No. 201910121357.8, Notice of Grant and Supplemental Search dated Dec. 4, 2020, 5 pages with English Translation.

* cited by examiner

‹ Settings

Name registration

Generic name [         ] (Required)
Your general name will be displayed when your
language-specific names are unavailable Chinese name: [         ] (Optional)

English name: [         ] (Optional)

French name: [         ] (Optional)

[ Add ]

[ Complete ]

FIG. 3

Obtain a language conversion rule corresponding to the original name label based on the language version of the client of the current recipient in the group — 301

Translate the original name label into a corresponding target name label based on the language conversion rule — 302

NAME LABEL DISPLAY METHOD AND APPARATUS

CROSS-REFERENCE TO RELATED APPLICATION

The present disclosure is a continuation of International Application No. PCT/CN2020/073272, filed on Jan. 20, 2020, which claims priority to Chinese Patent Application No. 201910121357.8, titled "NAME LABEL DISPLAY METHOD AND APPARATUS", and filed by Tianjin Bytedance Technology Co., Ltd., on Feb. 19, 2019, both of which are hereby incorporated herein by reference.

TECHNICAL FIELD

The present disclosure relates to the field of Internet application technologies, and more particularly, to a method and apparatus for displaying a name label.

BACKGROUND

With the development of globalization, it is more and more common for people from different countries to live and work together. As a commonly used communication tool, instant messaging software has also begun to adapt to a trend of globalization. In order to solve a problem that users speaking different languages cannot perform communication directly, some instant messaging software provides a function of message translation. Users can use this function to translate a received message into a language they can understand.

When users chat using instant messaging software, a name label function (@username) is often used to notify a user who is mentioned to check a message. However, the function of message translation provided by current instant messaging software cannot translate "@username", which may cause that the user who is mentioned cannot know he/she is mentioned since content of the name label may be incomprehensible, thereby causing barriers in communication.

SUMMARY

The present disclosure provides a method and apparatus for displaying a name label, capable of solving a technical problem in the related art associated with barriers in communication when a user cannot understand content of a name label as the name label cannot be translated.

To this end, according to a first aspect of the present disclosure, a method for displaying a name label is provided. The method matches a corresponding name label based on a language version of a client of a recipient and displays the corresponding name label on the client of the recipient, thereby increasing a probability for a name label to be understood, improving efficiency of communication among users speaking different languages, and improving user experience.

According to a second aspect of the present disclosure, an apparatus for displaying a name label is provided.

According to a third aspect of the present disclosure, an electronic device is provided.

According to a fourth aspect of the present disclosure, a non-transitory computer-readable storage medium is provided.

According to a fifth aspect of the present disclosure, a computer program product is provided.

According to an embodiment in the first aspect of the present disclosure, a method for displaying a name label is provided. The method includes: obtaining an original group message sent in a group, the original group message carrying an original name label of a specified user; obtaining a target name label corresponding to the original name label based on a language version of a client of a current recipient in the group; replacing the original name label of the specified user carried in the original group message with the target name label to generate a target group message carrying the target name label; and displaying the target group message to a recipient user on the client of the current recipient.

With the method for displaying a name label according to the embodiment of the present disclosure, an original group message sent in a group is obtained. The original group message carries an original name label of a specified user. A target name label corresponding to the original name label is obtained based on a language version of a client of a current recipient in the group. The original name label of the specified user carried in the original group message is replaced with the target name label to generate a target group message carrying the target name label. The target group message is displayed to a recipient user on the client of the current recipient. In this way, by obtaining the target name label corresponding to the original name label based on the language version of the client of the current recipient in the group, and displaying the target group message carrying the target name label to the recipient user on the client of the current recipient, personalized display of name labels can be implemented since clients of different recipients may display name labels matching language versions used, thereby increasing a probability for a name label to be understood by the recipient user, improving efficiency of communication among users speaking different languages, and improving user experience.

According to an embodiment in the second aspect of the present disclosure, an apparatus for displaying a name label is provided. The apparatus includes: a first obtaining module configured to obtain an original group message sent in a group, the original group message carrying an original name label of a specified user; a second obtaining module configured to obtain a target name label corresponding to the original name label based on a language version of a client of a current recipient in the group; a replacing module configured to replace the original name label of the specified user carried in the original group message with the target name label to generate a target group message carrying the target name label; and a display module configured to display the target group message to a recipient user on the client of the current recipient.

With the apparatus for displaying a name label according to the embodiment of the present disclosure, an original group message sent in a group is obtained. The original group message carries an original name label of a specified user. A target name label corresponding to the original name label is obtained based on a language version of a client of a current recipient in the group. The original name label of the specified user carried in the original group message is replaced with the target name label to generate a target group message carrying the target name label. The target group message is displayed to a recipient user on the client of the current recipient. In this way, by obtaining the target name label corresponding to the original name label based on the language version of the client of the current recipient in the group, and displaying the target group message carrying the target name label to the recipient user on the client of the current recipient, personalized display of name labels can be implemented since clients of different recipients may display name labels matching language versions used, thereby increasing a probability for a name label to be understood by the recipient user, improving efficiency of communication among users speaking different languages, and improving user experience.

According to an embodiment in the third aspect of the present disclosure, an electronic device is provided. The electronic device includes a processor and a memory. The processor executes, by reading executable program codes stored in the memory, a program corresponding to the executable program codes, to implement the method for displaying a name label according to the embodiment in the first aspect.

According to an embodiment in the fourth aspect of the present disclosure, a non-transitory computer-readable storage medium is provided. The non-transitory computer-readable storage medium has a computer program stored thereon. The program, when executed by a processor, implements the method for displaying a name label according to the embodiment in the first aspect.

According to an embodiment in the fifth aspect of the present disclosure, a computer program product is provided. Instructions in the computer program product, when executed by a processor, implement the method for displaying a name label according to the embodiment in the first aspect.

Additional aspects and advantages of the present disclosure will be given at least in part in the following description, or become apparent at least in part from the following description, or can be learned from practicing of the present disclosure.

BRIEF DESCRIPTION OF DRAWINGS

The accompanying drawings are used to provide a further understanding of the present disclosure, and constitute a part of the specification. The accompanying drawings, together with the following specific implementations, are used to explain, rather than constituting a limitation to, the present disclosure, in which.

DESCRIPTION OF EMBODIMENTS

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A method and apparatus for displaying a name label according to the embodiments of the present disclosure will be described below with reference to the figures.

Since names of a same user may be completely different in different languages, the names of the same user in different languages cannot be converted correctly, resulting in barriers in communication. For example, if a user's Chinese name is Li Ming and his/her English name is David, in existing instant messaging software providing a function of message translation, neither can Li Ming be translated into David, nor can David be translated into Li Ming.

To overcome the above defect, the present disclosure provides a name label display capable of matching a corresponding name label based on a language version of a client of a recipient and to display the corresponding name label on the client of the recipient, so as to increase a probability for the name label to be understood, and to improve efficiency in communication among users speaking different languages.

Figure 1:
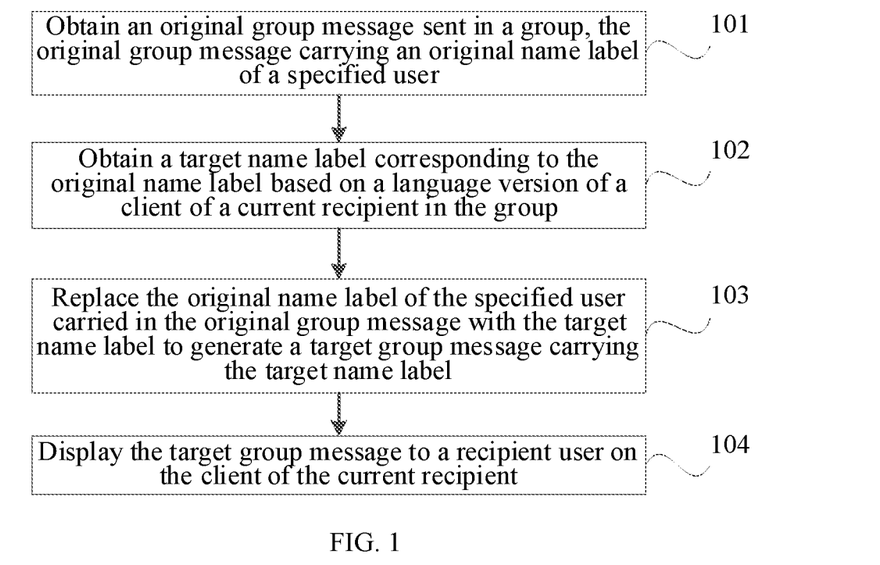
FIG. 1 is a flowchart illustrating a method for displaying a name label according to an embodiment of the present disclosure.

FIG. 1 is a flowchart illustrating a method for displaying a name label according to an embodiment of the present disclosure. The method may be applied to instant messaging software (client), and may be executed by a server corresponding to the client. The client is installed in an electronic device such as a smart phone, a tablet computer, a desktop computer, and a notebook computer. For consistency of description, the following embodiments will be given with reference to an example in which the method for displaying a name label of the present disclosure is applied to the client, for explaining solutions of the present disclosure.

As illustrated in FIG. 1, the method for displaying a name label includes the following steps.

At step 101, an original group message sent in a group is obtained. The original group message carries an original name label of a specified user.

The original name label of the specified user may be a nickname in group of the specified user in the current group. Alternatively, when the specified user has not set a nickname in group, the original name label of the specified user may be a nickname registered by the specified user on a client.

In a group chat, since there may be a number of group members and a number of group messages, a name label function is often used to notify a specified user to check a message. For example, if a name of User B in a group is "", and User A wants User B to come to User A's office at two o'clock, then User A may use a name label to notify User B in the group. For example, User A may send a group message "Come to my office at two o'clock @" in the group. Here "@**" is used to specify User B. When User A sends an original group message, the message may be sent in a language corresponding to a language version of a client used by User A. For example, if the language version of the client used by User A is Chinese, User A may send a message in Chinese in the group. If the language version of the client used by User A is English, User A may send a message in English in the group.

In a group chat, there are usually a plurality of recipients. Except a user who is currently sending a message as a sender, all other users are recipients. For example, there may be three users in a group: User A, User B, and User C. When User A sends a message, User B and User C are recipients. When User B sends a message, User A and User C are recipients.

In an embodiment, a client of a recipient may obtain an original group message sent in a group. The original group message carries an original name label of a specified user.

As an example, when the client of the recipient receives a message sent by a sender, it may be determined first whether the currently received message contains a symbol "@" before displaying the message. When it is detected that the currently received message contains the symbol "@", the currently received message may be determined as the original group message carrying the original name label of the specified user. When the symbol "@" is not detected, the received message may be displayed directly, or the received message may be translated into a language used by the client of the recipient for displaying.

As an example, the client of the recipient may directly display the original group message carrying the original name label of the specified user as sent by the client of the sender. When the client of the recipient receives a translation instruction from a user, the original group message corresponding to the translation instruction may be obtained.

At step 102, a target name label corresponding to the original name label is obtained based on a language version of a client of a current recipient in the group.

The language version of the client of the current recipient may be obtained from a setting parameter of a language setting option of the client of the current recipient. It is also possible to obtain the language version set by the user when the user sets the language version of the client of the current recipient using the language setting option, and store the language version in the client.

In an embodiment, names in different languages of each user may be stored in advance. For example, a Chinese name, an English name, a Korean name, and a French name of User A may be stored in advance, and Chinese name of User B may be stored. The names in different languages of each user may be stored in the client, or in a server corresponding to the client. Furthermore, after the original group message carrying the original name label of the specified user is obtained, the target name label corresponding to the original name label may be obtained based on the language version of the client of the current recipient in the group.

For example, it is assumed that there are three users in a group: User A, User B, and User C. The language version of the client used by User A is Chinese, the language version of the client used by User B is English, and the language version of the client used by User C is French. In a case where a Chinese name, an English name, a Korean name, and a French name of User B are pre-stored, when User A sends the original group message (in Chinese) carrying the original name label of User B to the group, the client of User B can obtain the English name of User B as the target name label, and the client of User C can obtain the French name of User B as the target name label.

At step 103, the original name label of the specified user carried in the original group message is replaced with the target name label to generate a target group message carrying the target name label.

In an embodiment, after the target name label corresponding to the original name label of the specified user is obtained, the original name label of the specified user carried in the original group message may be replaced with the target name label obtained to generate the target group message. The target group message carries the target name label of the specified user.

At step 104, the target group message is displayed to a recipient user on the client of the current recipient.

In an embodiment, the original name label in the original group message is replaced with the target name label. After the target group message carrying the target name label of the specified user is generated, the target group message carrying the target name label of the specified user may be displayed in the client of the current recipient to display the target group message to the recipient user. In the target group message displayed on the client of the recipient, the language of content of the message may be consistent with the language of the original group message, and the language of the target name label may be consistent with the language version of the client of the recipient. Since the target name label of the specified user carried in the target group message is obtained based on the language version of the client of the recipient, the recipient user may correctly understand content of the target group message, avoiding language barriers in communication.

Continuing with the above example, assuming that User B sets his/her Chinese name as Li Ming and English name as David, and the message sent by User A in the group is "Come to my office now @Li Ming", then the target group message displayed on the client used by User B is "Come to my office now @David".

In a possible implementation of an embodiment of the present disclosure, a translation button may be provided for messages (including received messages and sent messages) displayed on the client. When the user triggers the translation button corresponding to a message, languages that may be translated into can be further displayed for the user to choose from. The displayed languages that may be translated into may be determined based on language versions supported by the client. After the user selects a target language, the message is translated into content in the target language. For example, after the client of User B receives the target group message "Come to my office now@David", he/she may click the translation button corresponding to the target group message to translate the content of the target group message "Come to my office now" into English or other languages. In this way, an autonomous choice for the user to translate content of messages may be provided, and flexibility may be improved.

In a possible implementation of an embodiment of the present disclosure, the client of the recipient may also translate content of a received message based on the language version of the client. Translated content of the message and the target name label may be displayed on the client to facilitate understanding of the content of the message by the user. For example, in the above example, the client of User B may translate the content of the message "Come to my office now" into English before displaying the message to User B. In practical applications, a function of "Automatic Translation of Message Content" may be provided in the client. The user may choose whether to enable this function as desired. When the user chooses to enable this function, the client will translate the original group message and the original name label carried in the original group message into a message in a language consistent with the language version of the client before displaying the original group message and the original name label. When the user chooses not to enable this function, the client only translates the original name label into the target name label in a language consistent with the language version of the client.

With the method for displaying a name label according to the embodiment, an original group message sent in a group is obtained. The original group message carries an original name label of a specified user. A target name label corresponding to the original name label is obtained based on a language version of a client of a current recipient in the group. The original name label of the specified user carried in the original group message is replaced with the target name label to generate a target group message carrying the target name label. The target group message is displayed to a recipient user on the client of the current recipient. In this way, by obtaining the target name label corresponding to the original name label based on the language version of the client of the current recipient in the group, and displaying the target group message carrying the target name label to the recipient user on the client of the current recipient, personalized display of name labels can be implemented since clients of different recipients may display name labels matching language versions used, thereby increasing a probability for a name label to be understood by the recipient user, improving efficiency of communication among users speaking different languages, and improving user experience.

The embodiments of the present disclosure provide two possible implementations for obtaining the target name label corresponding to the original name label based on the language version of the client of the current recipient in the group. Detailed description will be given below with reference to FIG. 2 and FIG. 4 respectively.

Figure 2:
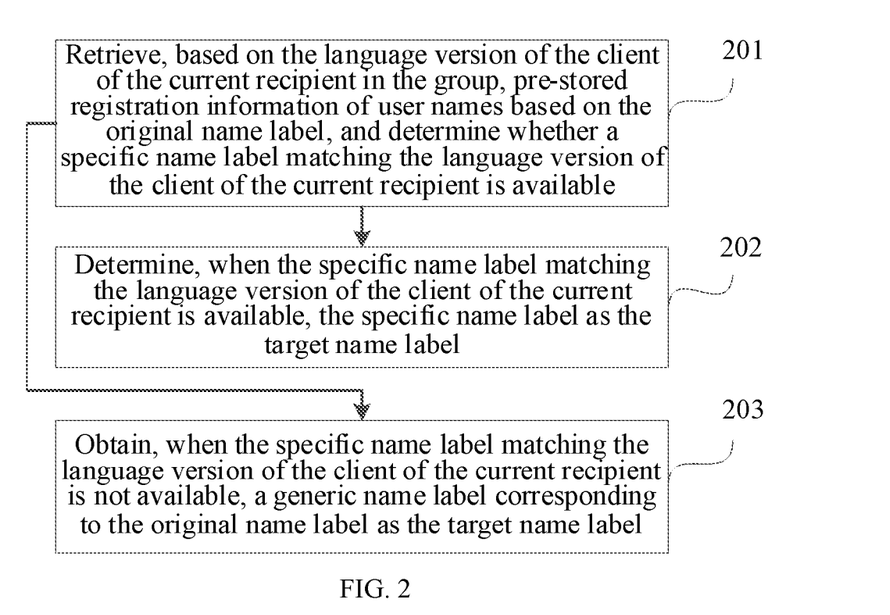
FIG. 2 is a flowchart illustrating a method for displaying a name label according to another embodiment of the present disclosure.

FIG. 2 is a flowchart illustrating a method for displaying a name label according to another embodiment of the present disclosure. On a basis of the embodiment illustrated in FIG. 1, the step 102 may include the following steps, as illustrated in FIG. 2.

At step 201, based on the language version of the client of the current recipient in the group, pre-stored registration information of user names is retrieved based on the original name label, and it is determined whether a specific name label matching the language version of the client of the current recipient is available.

Figure 3:
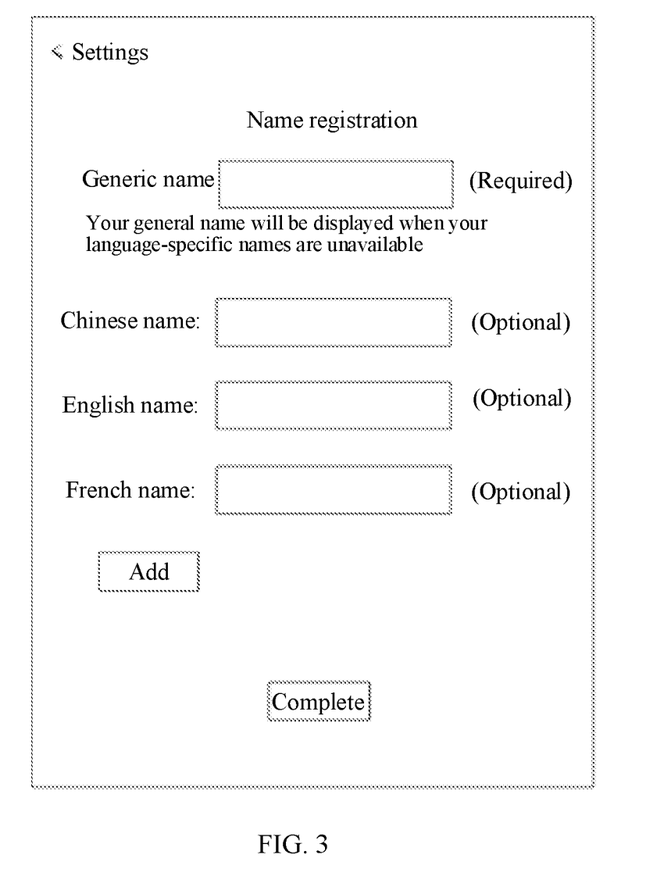
FIG. 3 is a schematic diagram showing an example of a name registration interface.

The registration information of user names may include names entered by respective users in the group through name registration interfaces provided by clients used by respective users. For example, FIG. 3 is a schematic diagram showing an example of a name registration interface. As illustrated in FIG. 3, the name registration interface allows the user to input a generic name and language-specific names. The generic name is a required item, and explanation information like "your generic name will be displayed when your language-specific names are unavailable" can be displayed below an input box of the generic name. The generic name may be a name in any language, a nickname in group as set by the user in the group, or a nickname set by the user in the client. The language-specific names are optional items. Input items of the language-specific names may be set based on language versions supported by the client. For example, if languages supported by the client are Chinese, English, and French, input items of the language-specific names provided in the name registration interface may include a Chinese name, an English name, and a French name. In addition, when the user inputs a name in a certain language, for another language with language rules similar to these of the certain language, the client may automatically translate the name into the other language for the user to reduce the user's input operations. For example, after the user inputs the Chinese name, the Chinese name may be converted into a corresponding Korean name based on the Chinese name inputted by the user, and the corresponding Korean name may be displayed in an input box corresponding to the Korean name. Of course, the user may also modify or delete the automatically translated name.

As illustrated in FIG. 3, the name registration interface also provides an "Add" option. When the user clicks "Add", a list of languages may be displayed for the user to choose from. The user may choose to add a new language and set a corresponding name. For example, if the user wants to set a Korean name, and there is no input item for the Korean name in the current name registration interface, the user may click "Add" to select Korean from a displayed list of languages, and input his/her Korean name in a corresponding input box to complete registration of the Korean name. In this way, flexibility for the user to set names in different languages may be improved. After completing an input, the user clicks "Complete", and the client stores name information corresponding to the user based on the input of the user.

When different users form a group, name information may be exchanged with each other. Each client uses received name information and its own name information to establish the registration information of user names and store it in the client. Alternatively, when different users form a group, each client may send corresponding name information to a server. The server can establish the registration information of user names based on name information of respective users in the group, and send the registration information of user names to each client.

Since an identity ach user registers in the client is unique, as an example, a correspondence between identities of users and name information registered by the users may be stored in the registration information of user names, as illustrated in Table 1.

TABLE 1

| Identity a | |
| --- | --- |
| Generic name | Name a1 |
| Chinese name | Name a2 |
| French name | Name a3 |
| Identity b | |
| Generic name | Name b1 |
| English name | Name b2 |
| Identity c | |
| Generic name | Name c1 |

In an embodiment, after the original group message carrying the original name label of the specified user as sent in the group is obtained, it may be determined, based on the language version of the client of the current recipient and the original name label in the group, whether a specific name label matching the language version of the client of the current recipient is available by retrieving the pre-stored registration information of user names.

Taking the registration information of user names illustrated in Table 1 as an example, and it is assumed that the language version of the client used by User A corresponding to Identity a is Chinese, the language version of the client used by User B corresponding to Identity b is English, and the language version of the client used by User C corresponding to Identity c is French. If User C sends a message "Please come to my office now @Identity c", it can be determined that the specific name label matching the language version of the client of User A is available as Name a2 based on the language version (Chinese) of the client used by User A and the original label information (Identity a). On a basis of the language version (English) of the client used by User B and the original label information (Identity a), it can be determined that the specific name label matching the language version of the client of user B is not available.

At step 202, when the specific name label matching the language version of the client of the current recipient is available, the specific name label is determined as the target name label.

In an embodiment, when the specific name label matching the language version of the client of the current recipient is available, the specific name label may be determined as the target name label. For example, in the above example, for the client used by User A, Name a2 may be obtained as the target name label corresponding to the original name label (Identity a).

At step 203, if the specific name label matching the language version of the client of the current recipient is not available, a generic name label corresponding to the original name label is obtained as the target name label.

In an embodiment, when the specific name label matching the language version of the client of the current recipient is not available, the generic name label corresponding to the original name label may be obtained as the target name label. For example, in the above example, for the client used by User B, Name a1 may be obtained as the target name label corresponding to the original name label (Identity a).

With the method for displaying a name label according to an embodiment, on a basis of the language version of the client of the current recipient in the group, pre-stored registration information of user names is retrieved based on the original name label, and it is determined whether a specific name label matching the language version of the client of the current recipient is available. If the specific name label matching the language version of the client of the current recipient is available, the specific name label is determined as the target name label. If the specific name label matching the language version of the client of the current recipient is not available, a generic name label corresponding to the original name label is obtained as the target name label. In this way, each recipient user may be notified of the specified user, and the efficiency of communication among users speaking different languages may be improved.

Figure 4:
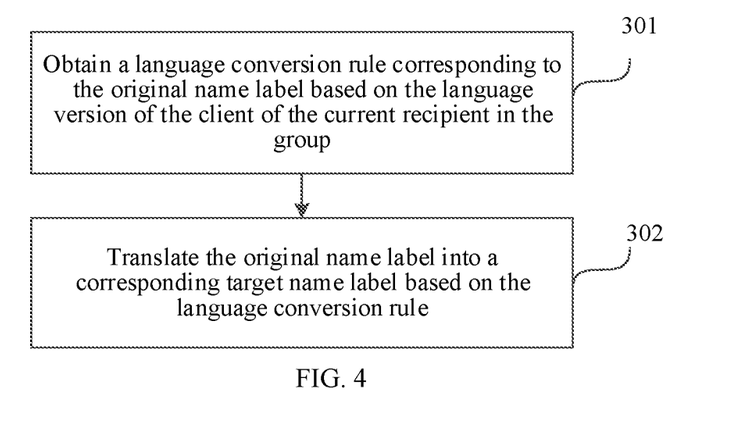
FIG. 4 is a flowchart illustrating a method for displaying a name label according to yet another embodiment of the present disclosure.

FIG. 4 is a flowchart illustrating a method for displaying a name label according to yet another embodiment of the present disclosure. On a basis of the embodiment illustrated in FIG. 1, the step 102 may include the following steps, as illustrated in FIG. 4.

At step 301, a language conversion rule corresponding to the original name label is obtained based on the language version of the client of the current recipient in the group.

Some languages, such as Chinese and Korean, have similar language rules. For names having similar language rules, the present disclosure provides a corresponding language conversion rule to automatically translate such names, thereby ensuring a correct name conversion rate, reducing operations of the user inputting names in different languages, and lowering operation costs.

In an embodiment, after the original group message carrying the original name label of the specified user as sent in the group is obtained, the language conversion rule corresponding to the original name label may be obtained based on the language version of the client of the current recipient in the group.

For example, if the language version of the client of User D is Korean, and the original name label is the Chinese name of User A, the language conversion rule may be obtained as Chinese to Korean.

At step 302, the original name label is translated into a corresponding target name label based on the language conversion rule.

In an embodiment, after the language conversion rule is determined, the original name label may be translated into the corresponding target name label based on the language conversion rule.

For example, if the original name label is the Chinese name "Li Ming", and the determined language conversion rule is Chinese to Korean, the Chinese name "Li Ming" can be translated into a Korean name "이명".

With the method for displaying a name label according to an embodiment, a language conversion rule corresponding to the original name label is obtained based on the language version of the client of the current recipient in the group. The original name label is translated into a corresponding target name label based on the language conversion rule. In this way, operations of the user inputting names in different languages may be simplified, such that operation costs can be saved, barriers in communication among users speaking different languages can be avoided, and user experience can be improved.

Figure 5:
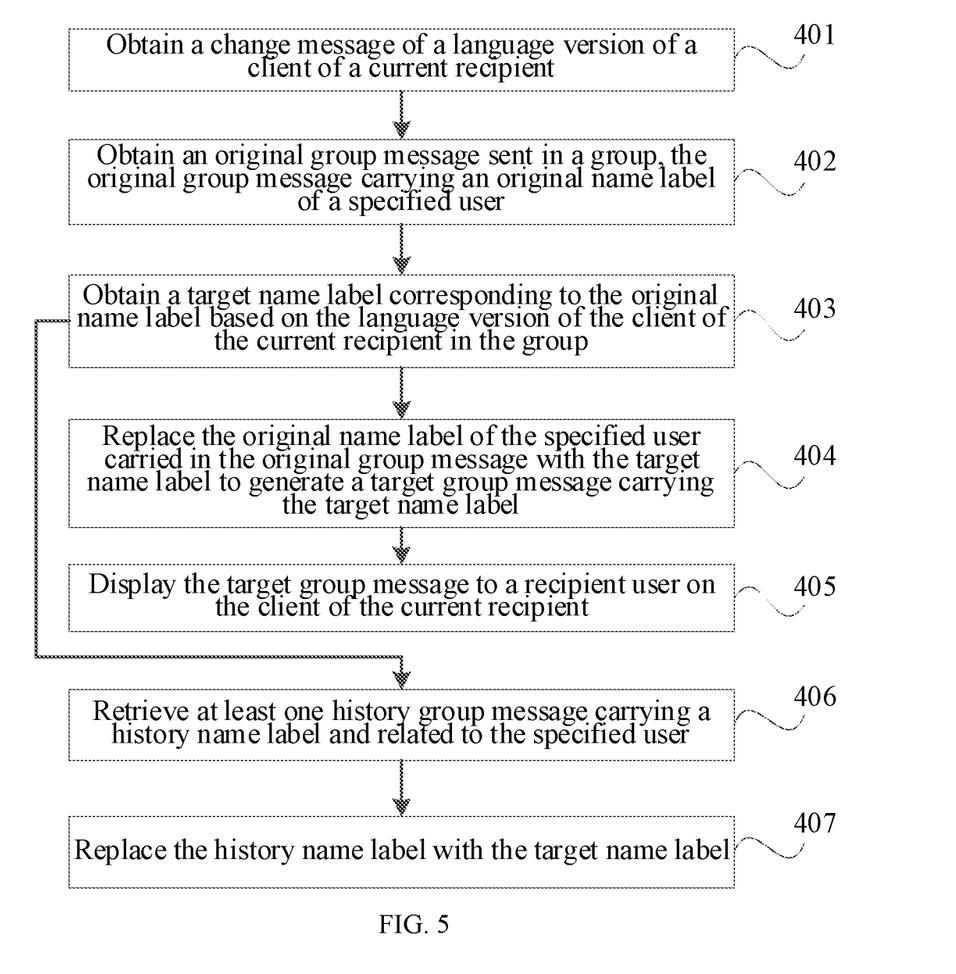
FIG. 5 is a flowchart illustrating a method for displaying a name label according to still yet another embodiment of the present disclosure.

FIG. 5 is a flowchart illustrating a method for displaying a name label according to still yet another embodiment of the present disclosure. As illustrated in FIG. 5, the method for displaying a name label may include the following steps.

At step 401, a change message of a language version of a client of a current recipient is obtained.

In an embodiment, the user may switch the language version of the client as needed. For example, the user may select the language version of the client from a language setting option provided on a setting interface of the client. When the recipient user switches the language version of the client of the current recipient, the client of the current recipient may obtain the change message of the language version.

For example, a language originally used by the client of User A is Chinese. If user A switches the language version of the client from Chinese to English now using the language setting option of the client, a setting parameter of the language setting option of the client of User A may be changed from Chinese to English.

At step 402, an original group message sent in a group is obtained. The original group message carries an original name label of a specified user.

At step 403, a target name label corresponding to the original name label is obtained based on the language version of the client of the current recipient in the group.

At step 404, the original name label of the specified user carried in the original group message is replaced with the target name label to generate a target group message carrying the target name label.

At step 405, the target group message is displayed to a recipient user on the client of the current recipient.

In this embodiment, for description of steps 402-405, reference may be made to the description of steps 101-104 in the above embodiment, and thus details thereof will be omitted here.

At step 406, at least one history group message carrying a history name label and related to the specified user is retrieved.

As an example, the client of the current recipient may search a history cache for the at least one history group message carrying the history name label and related to the specified user. For example, if the language version of the client of the current recipient is changed from Chinese to English, and the user specified by the original name label carried in the original group message is User A, the client of the current recipient may search the history cache for the least one history group message related to User A. Since the client of the current recipient used Chinese previously, the least one history group message obtained may carry the Chinese name label of User A, or the generic name label of User A.

At step 407, the history name label is replaced with the target name label.

In an embodiment, after the at least one history group message carrying the history name label and related to the specified user is obtained, the history name label may be replaced with the target name label.

With the method for displaying a name label according to the embodiment, a change message of the language version of the client of the current recipient is obtained. After a target name label corresponding to the original name label is obtained, at least one history group message carrying a history name label and related to the specified user is retrieved. Then, the history name label is replaced with the target name label. In this way, new messages and the at least one history group message displayed in the client can match the changed language version, which is more in line with language requirements of the user, thereby facilitating further consumption of the at least one history group message by the user.

To implement the above embodiments, the present disclosure further provides an apparatus for displaying a name label.

Figure 6:
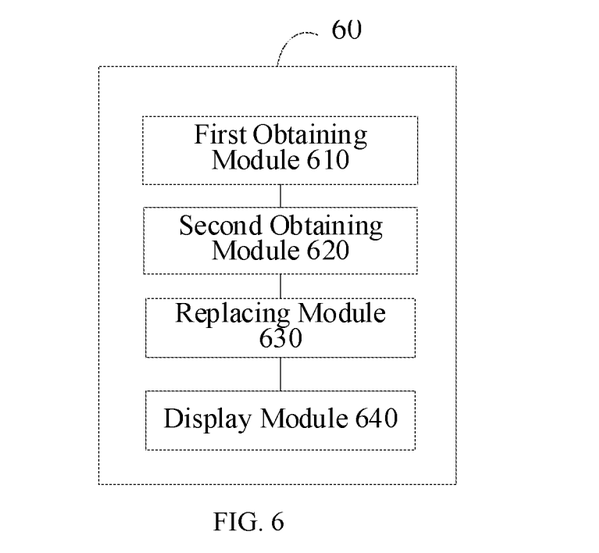
FIG. 6 is a block diagram showing a structure of an apparatus for displaying a name label according to an embodiment of the present disclosure.

FIG. 6 is a block diagram showing a structure of an apparatus for displaying a name label according to an embodiment of the present disclosure.

As illustrated in FIG. 6, an apparatus 60 for displaying a name label includes a first obtaining module 610, a second obtaining module 620, a replacing module 630, and a display module 640.

The first obtaining module 610 is configured to obtain an original group message sent in a group. The original group message carries an original name label of a specified user.

The second obtaining module 620 is configured to obtain a target name label corresponding to the original name label based on a language version of a client of a current recipient in the group.

The replacing module 630 is configured to replace the original name label of the specified user carried in the original group message with the target name label to generate a target group message carrying the target name label.

The display module 640 is configured to display the target group message to a recipient user on the client of the current recipient.

Figure 7:
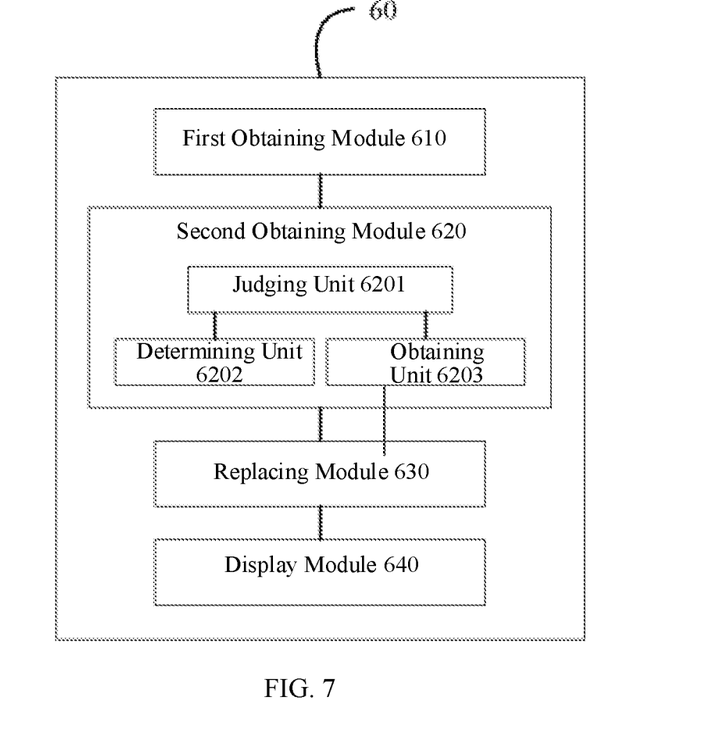
FIG. 7 is a block diagram showing a structure of an apparatus for displaying a name label according to another embodiment of the present disclosure.

In a possible implementation of an embodiment of the present disclosure, on a basis of the embodiment illustrated in FIG. 6, the second obtaining module 620 may include a judging unit 6201, a determining unit 6202, and an obtaining unit 6203, as illustrated in FIG. 7.

The judging unit 6201 may be configured to retrieve, based on the language version of the client of the current recipient in the group, pre-stored registration information of user names based on the original name label, and to determine whether a specific name label matching the language version of the client of the current recipient is available.

The determining unit 6202 may be configured to determine, when the specific name label matching the language version of the client of the current recipient is available, the specific name label as the target name label.

The obtaining unit 6203 may be configured to obtain, when the specific name label matching the language version of the client of the current recipient is not available, a generic name label corresponding to the original name label as the target name label.

In this way, each recipient user may be notified of the specified user, and the efficiency of communication among users speaking different languages may be improved.

Figure 8:
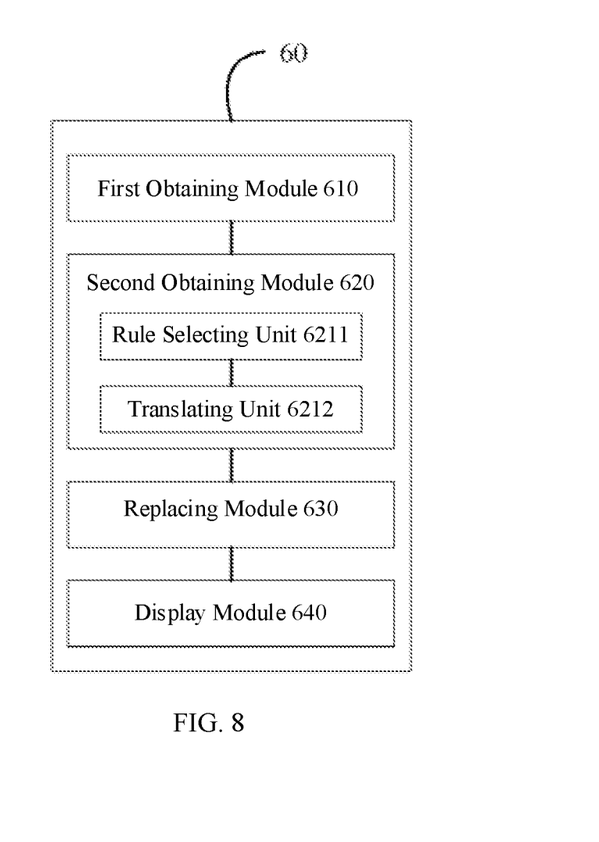
FIG. 8 is a block diagram showing a structure of an apparatus for displaying a name label according to yet another embodiment of the present disclosure.

In a possible implementation of an embodiment of the present disclosure, on the basis of the embodiment illustrated in FIG. 6, the second obtaining module 620 may include a rule selecting unit 6211 and a translating unit 6212, as illustrated in FIG. 8.

The rule selecting unit 6211 may be configured to obtain a language conversion rule corresponding to the original name label based on the language version of the client of the current recipient in the group.

The translating unit 6212 may be configured to translate the original name label into a corresponding target name label based on the language conversion rule.

In this way, operations of the user inputting names in different languages may be simplified, such that operation costs can be saved, barriers in communication among users speaking different languages can be avoided, and user experience can be improved.

Figure 9:
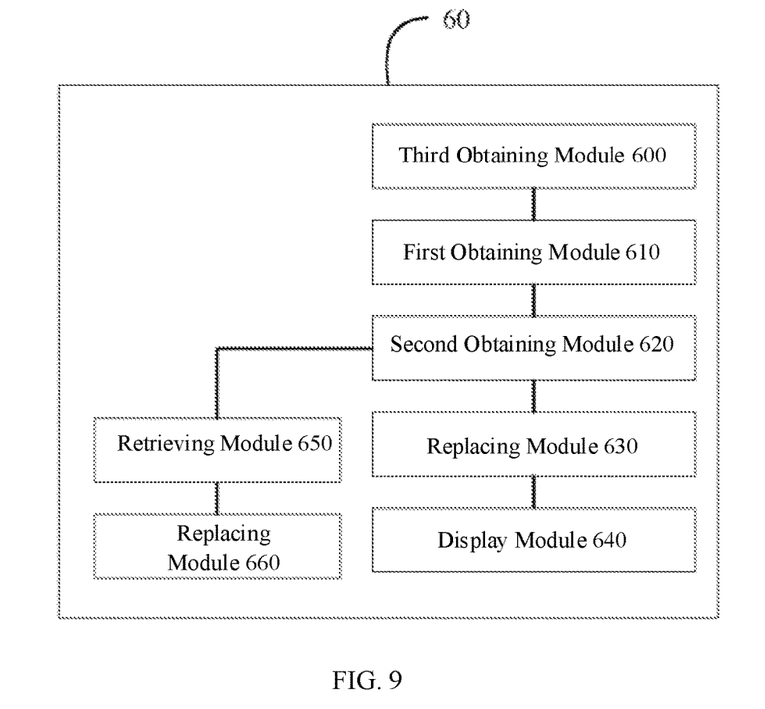
FIG. 9 is a block diagram showing a structure of an apparatus for displaying a name label according to still yet another embodiment of the present disclosure.

In a possible implementation of an embodiment of the present disclosure, on the basis of the embodiment illustrated in FIG. 6, the apparatus 60 for displaying the name label further includes a third obtaining module 600, a retrieving module 650, and a second replacing module 660, as illustrated in FIG. 9.

The third obtaining module 600 may be configured to obtain a change message of the language version of the client of the current recipient.

The retrieving module 650 may be configured to retrieve at least one history group message carrying a history name label and related to the specified user.

The second replacing module 660 may be configured to replace the history name label with the target name label.

In this way, new messages and the at least one history group message displayed in the client can match the changed language version, which is more in line with language requirements of the user, thereby facilitating further consumption of the at least one history group message by the user.

It is to be noted that the above description of the embodiments of the method for displaying the name label is also applicable to the apparatus for displaying the name label according to the embodiments, and implementation principles of the method are similar to implementation principles of the apparatus, and thus details thereof will be omitted here.

With the apparatus for displaying a name label according to the embodiment of the present disclosure, an original group message sent in a group is obtained. The original group message carries an original name label of a specified user. A target name label corresponding to the original name label is obtained based on a language version of a client of a current recipient in the group. The original name label of the specified user carried in the original group message is replaced with the target name label to generate a target group message carrying the target name label. The target group message is displayed to a recipient user on the client of the current recipient. In this way, by obtaining the target name label corresponding to the original name label based on the language version of the client of the current recipient in the group, and displaying the target group message carrying the target name label to the recipient user on the client of the current recipient, personalized display of name labels can be implemented since clients of different recipients may display name labels matching language versions used, thereby increasing a probability for a name label to be understood by the recipient user, improving efficiency of communication among users speaking different languages, and improving user experience.

To implement the above embodiments, the present disclosure also provides an electronic device. The electronic device includes a processor and a memory. The processor executes, by reading executable program codes stored in the memory, a program corresponding to the executable program codes, to implement the method for displaying the name label according to the above embodiments.

Figure 10:
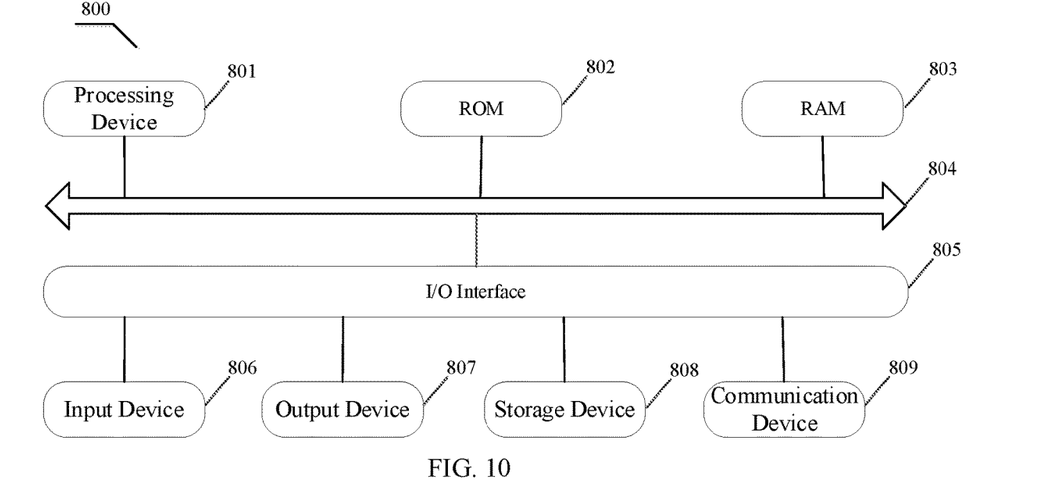
FIG. 10 is a block diagram showing a structure of an electronic device according to an embodiment of the present disclosure.

Reference is now made to FIG. 10, which is a block diagram showing a structure of an electronic device 800 suitable for implementing an embodiment of the present disclosure. A terminal device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 10 is exemplary only, and should not be construed as limiting the function and scope of use of the embodiments of the present disclosure.

As illustrated in FIG. 10, the electronic device 800 may include a processing device (such as a central processing unit, a graphics processing unit, etc.) 801, which may perform various appropriate actions and processes in accordance with programs stored in a Read Only Memory (ROM) 802 or loaded from a storage device 808 into a Random Access Memory (RAM) 803. In the RAM 803, various programs and data required for operation of the electronic device may also be stored. The processing device 801, the ROM 802, and the RAM 803 are connected to each other through a bus 804. An Input/Output (I/O) interface 805 is also connected to the bus 804.

Generally, the following devices may be connected to the I/O interface 805: an input device 806 including, for example, a touch screen, a touch pad, a keyboard, a mouse, a camera, a microphone, an accelerometer, a gyroscope, etc.; an output device 807 including, for example, a Liquid Crystal Display (LCD), a speaker, an oscillator, etc.; the storage device 808 including, for example, a magnetic tape or a hard disk; and a communication device 809. The communication device 809 may allow the electronic device 800 to perform wireless or wired communication with other devices for data exchange. Although FIG. 10 illustrates the electronic device 800 having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 809, or installed from the storage device 808, or installed from the ROM 802. When the computer program is executed by the processing device 801, the above functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes stored on the computer-readable medium may be transmitted via any appropriate medium, including but not limited to electric cable, optical cable, Radio Frequency (RF), or any suitable combination thereof.

The above computer-readable medium may be included in the above electronic device; or may be standalone without being assembled into the electronic device.

The above computer-readable medium may carry one or more programs which, when executed by the electronic device, cause the electronic device to: obtain an original group message sent in a group, the original group message carrying an original name label of a specified user; obtain a target name label corresponding to the original name label based on a language version of a client of a current recipient in the group; replace the original name label of the specified user carried in the original group message with the target name label to generate a target group message carrying the target name label; and display the target group message to a recipient user on the client of the current recipient.

The computer program code for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure may be implemented in software or hardware. A name of a module does not constitute a limitation on the module itself under certain circumstances. For example, a first obtaining module may also be described as "a module for obtaining an original group message sent in a group, the original group message carrying an original name label of a specified user".

To implement the above embodiments, the present disclosure further provides a non-transitory computer-readable storage medium. The non-transitory computer-readable storage medium stores a computer program. When the program is executed by a processor, the method for displaying a name label as described in the above embodiments is implemented.

Figure 11:
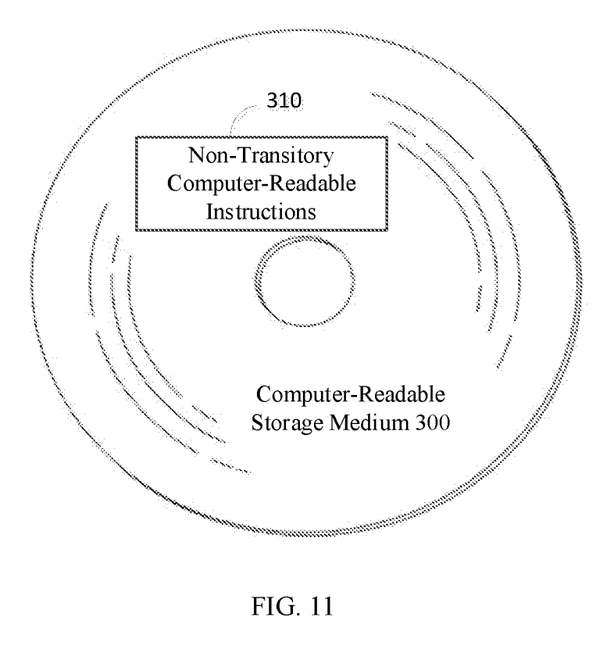
FIG. 11 is a schematic diagram showing a computer-readable storage medium according to an embodiment of the present disclosure.

FIG. 11 is a schematic diagram showing a computer-readable storage medium according to an embodiment of the present disclosure. As illustrated in FIG. 11, a computer-readable storage medium 300 according to the embodiment of the present disclosure has non-transitory computer-readable instructions 310 stored thereon. The non-transitory computer-readable instructions 310, when executed by a processor, implements all or part of the steps of the method for displaying the name label according to the above embodiments of the present disclosure.

To implement the above embodiments, according to an embodiment in still yet another aspect of the present disclosure, a computer program is provided. The program, when executed by a processor, implements the method for displaying the name label according to the above embodiment of the present disclosure.

In the present disclosure, the description with reference to the terms "one embodiment", "some embodiments", "an example", "a specific example", or "some examples", etc., means that specific features, structures, materials, or characteristics described in conjunction with the embodiment(s) or example(s) are included in at least one embodiment or example of the present disclosure. In the present disclosure, any illustrative reference of the above terms does not necessarily refer to the same embodiment(s) or example(s). Moreover, the specific features, structures, materials or characteristics as described can be combined in any one or more embodiments or examples as appropriate. In addition, those skilled in the art can combine and integrate different embodiments or examples, or features thereof, as described in the present disclosure, provided that they do not contradict each other.

In addition, the terms "first" and "second" are only used for the purpose of description, and should not be construed as indicating or implying any relative importance or implicitly indicating the number of defined technical features. Therefore, the features defined with "first" and "second" may explicitly or implicitly include at least one of the features. In the description of the present disclosure, "a plurality of" means at least two, e.g., two, three, etc., unless specifically defined otherwise.

Any process or method described in the flowchart or described otherwise herein can be understood as a module, segment or part of codes that include one or more executable instructions for implementing steps of specific logical functions or processes. It can be appreciated by those skilled in the art that the scope of the preferred embodiments of the present disclosure includes additional implementations where functions may not be performed in the order as shown or discussed, including implementations where the involved functions are performed substantially in parallel or even in a reverse order.

The logics and/or steps represented in the flowchart or described otherwise herein can be for example considered as a list of ordered executable instructions for implementing logic functions, and can be embodied in any computer-readable medium that is to be used by or used with an instruction execution system, apparatus, or device (such as a computer-based system, a system including a processor, or any other system that can retrieve and execute instructions from an instruction execution system, apparatus, or device). For the present disclosure, a "computer-readable medium" can be any apparatus that can contain, store, communicate, propagate, or transmit a program to be used by or used with an instruction execution system, apparatus, or device. More specific examples of computer-readable mediums include, as a non-exhaustive list: an electrical connector (electronic device) with one or more wirings, a portable computer disk case (magnetic devices), a Random Access Memory (RAM), a Read Only Memory (ROM), an Erasable Programmable Read Only Memory (EPROM or flash memory), a fiber optic device, and a portable Compact Disk Read Only memory (CDROM). In addition, the computer-readable medium may even be paper or other suitable medium on which the program can be printed, as the program can be obtained electronically, e.g., by optically scanning the paper or the other medium, and then editing, interpreting, or otherwise processing the scanning result when necessary, and then stored in a computer memory.

It can be appreciated that each part of the present disclosure can be implemented in hardware, software, firmware or any combination thereof. In the above embodiments, a number of steps or methods can be implemented using software or firmware stored in a memory and executed by a suitable instruction execution system. For example, when implemented in hardware, as in another embodiment, it can be implemented by any one or combination of the following technologies known in the art: a discrete logic circuit having logic gate circuits for implementing logic functions on data signals, an application-specific integrated circuit with suitable combined logic gates, a Programmable Gate Array (PGA), a Field Programmable Gate Array (FPGA), etc.

It can be appreciated by those skilled in the art that all or part of the steps in the methods of the above embodiments can be implemented by relevant hardware following instructions of a program. The program can be stored in a computer-readable storage medium, and the program, when executed, implements any one or combination of the steps of the method embodiments.

In addition, the functional units in various embodiments of the present disclosure may be integrated into one processing module, or each unit may be standalone physically, or two or more units may be integrated into one module. The above integrated module can be implemented in a form of hardware or in a form of a software functional module. When implemented in the form of the software function module and sold or used as an independent product, the integrated module can also be stored in a computer-readable storage medium.

The storage medium mentioned above may be a read only memory, a magnetic disk or an optical disc, etc. Although the embodiments of the present disclosure have been shown and described above, it can be appreciated that the above embodiments are exemplary only, and should not be construed as limiting the present disclosure. Various changes, modifications, replacements and variants can be made to the above embodiments by those skilled in the art without departing from the scope of the present disclosure.

What is claimed is:

1. A method for displaying a name label, comprising:
    obtaining an original group message sent in a group, the original group message carrying an original name label of a specified user, the original name label comprising a special symbol and a user name of the specified user, the special symbol notifying the specified user to check a message;
    obtaining a target name label corresponding to the original name label based on a language version of a client of a current recipient in the group, the target name label comprising the special symbol and another user name of the specified user, the other user name being in the language version of the client of the current recipient;
    replacing the original name label of the specified user carried in the original group message with the target name label to generate a target group message carrying the target name label; and
    displaying the target group message to a recipient user on the client of the current recipient,
    wherein said obtaining the target name label corresponding to the original name label based on the language version of the client of the current recipient in the group further comprises:
        retrieving, based on the language version of the client of the current recipient in the group, pre-stored registration information of user names based on the original name label, and determining whether a specific name label matching the language version of the client of the current recipient is available, the pre-stored registration information of user names comprising names in different language versions input by each user in the group; and
        determining, when the specific name label matching the language version of the client of the current recipient is available, the specific name label as the target name label, and
    wherein the method further comprises, subsequent to determining whether the specific name label matching the language version of the client of the current recipient is available:
        obtaining, when the specific name label matching the language version of the client of the current recipient is not available, a generic name label corresponding to the original name label as the target name label.

2. The method of claim 1, wherein obtaining the target name label corresponding to the original name label based on the language version of the client of the current recipient in the group further comprises:
    obtaining a language conversion rule corresponding to the original name label based on the language version of the client of the current recipient in the group; and
    translating the original name label into a corresponding target name label based on the language conversion rule.

3. The method of claim 1, further comprising, prior to said obtaining the original group message carrying the original name label of the specified user sent to the group:
    obtaining a change message of the language version of the client of the current recipient, and
    subsequent to obtaining the target name label corresponding to the original name label based on the language version of the client of the current recipient in the group:
        retrieving at least one history group message carrying a history name label and related to the specified user; and
        replacing the history name label with the target name label.

4. An electronic device, comprising a processor and a memory, wherein the processor executes, by reading executable program codes stored in the memory, a program corresponding to the executable program codes that cause the electronic device to:
    obtain an original group message sent in a group, the original group message carrying an original name label of a specified user, the original name label comprising a special symbol and a user name of the specified user, the special symbol notifying the specified user to check a message;
    obtain a target name label corresponding to the original name label based on a language version of a client of a current recipient in the group, the target name label comprising the special symbol and another user name of the specified user, the other user name being in the language version of the client of the current recipient;
    replace the original name label of the specified user carried in the original group message with the target name label to generate a target group message carrying the target name label; and
    display the target group message to a recipient user on the client of the current recipient,
    wherein the processor executes, by reading the executable program codes stored in the memory, the program corresponding to the executable program codes, to:

retrieve, based on the language version of the client of the current recipient in the group, pre-stored registration information of user names based on the original name label, and determine whether a specific name label matching the language version of the client of the current recipient is available, the pre-stored registration information of user names comprising names in different language versions input by each user in the group; and determine, when the specific name label matching the language version of the client of the current recipient is available, the specific name label as the target name label, and wherein the processor executes, by reading the executable program codes stored in the memory, the program corresponding to the executable program codes, to:

obtain, when the specific name label matching the language version of the client of the current recipient is not available, a generic name label corresponding to the original name label as the target name label.

5. The electronic device according to claim 4, wherein the processor executes, by reading the executable program codes stored in the memory, the program corresponding to the executable program codes, to:

obtain a language conversion rule corresponding to the original name label based on the language version of the client of the current recipient in the group; and translate the original name label into a corresponding target name label based on the language conversion rule.

6. The electronic device according to claim 4, wherein the processor executes, by reading the executable program codes stored in the memory, the program corresponding to the executable program codes, to:

obtain a change message of the language version of the client of the current recipient, and retrieve at least one history group message carrying a history name label and related to the specified user; and replace the history name label with the target name label.

7. A non-transitory computer-readable storage medium having a computer program stored thereon, wherein the program, when executed by a processor, implements the method for displaying a name label comprising:

obtaining an original group message sent in a group, the original group message carrying an original name label of a specified user; the original name label comprising a special symbol and a user name of the specified user, the special symbol notifying the specified user to check a message;

obtaining a target name label corresponding to the original name label based on a language version of a client of a current recipient in the group; the target name label comprising the special symbol and another user name of the specified user, the other user name being in the language version of the client of the current recipient;

replacing the original name label of the specified user carried in the original group message with the target name label to generate a target group message carrying the target name label; and displaying the target group message to a recipient user on the client of the current recipient, wherein said obtaining the target name label corresponding to the original name label based on the language version of the client of the current recipient in the group further comprises:

retrieving, based on the language version of the client of the current recipient in the group, pre-stored registration information of user names based on the original name label, and determining whether a specific name label matching the language version of the client of the current recipient is available, the pre-stored registration information of user names comprising names in different language versions input by each user in the group; and determining, when the specific name label matching the language version of the client of the current recipient is available, the specific name label as the target name label, and wherein the method further comprises, subsequent to determining whether the specific name label matching the language version of the client of the current recipient is available:

obtain, when the specific name label matching the language version of the client of the current recipient is not available, a generic name label corresponding to the original name label as the target name label.

* * * * *